United States Patent [19]
Johnson

[11] 4,289,742
[45] Sep. 15, 1981

[54] CARBON BLACK RECOVERY
[75] Inventor: Paul H. Johnson, Bartlesville, Okla.
[73] Assignee: Phillips Petroleum Company, Bartlesville, Okla.
[21] Appl. No.: 44,147
[22] Filed: May 31, 1979
[51] Int. Cl.³ .................... C01B 31/02; C09C 1/48
[52] U.S. Cl. ........................... 423/450; 423/449
[58] Field of Search ........... 423/449, 450; 422/150, 422/152; 55/262, 315

[56] References Cited
U.S. PATENT DOCUMENTS

| | | | |
|---|---|---|---|
| 2,917,374 | 12/1959 | Wood | 23/314 |
| 3,146,080 | 8/1964 | Ruble | 55/96 |
| 3,369,870 | 2/1968 | Ganz et al. | 423/450 |
| 3,410,055 | 11/1968 | Zenz | 55/96 |
| 3,798,882 | 3/1974 | Kalen | 55/302 |
| 3,854,902 | 12/1974 | Kalen | 55/98 |

FOREIGN PATENT DOCUMENTS 1219158  6/1966  Fed. Rep. of Germany.
 695492  8/1953  United Kingdom ............... 423/450

Primary Examiner—O. R. Vertiz
Assistant Examiner—Gregory A. Heller

[57] ABSTRACT

A process and apparatus for recovering carbon black from hot smoke which comprises passing the smoke through a cyclone separation zone following cooling, then through aggregate filter beds and regeneration of filter beds with clean off-gas which is recycled through the carbon black reaction zone as quench.

5 Claims, 1 Drawing Figure

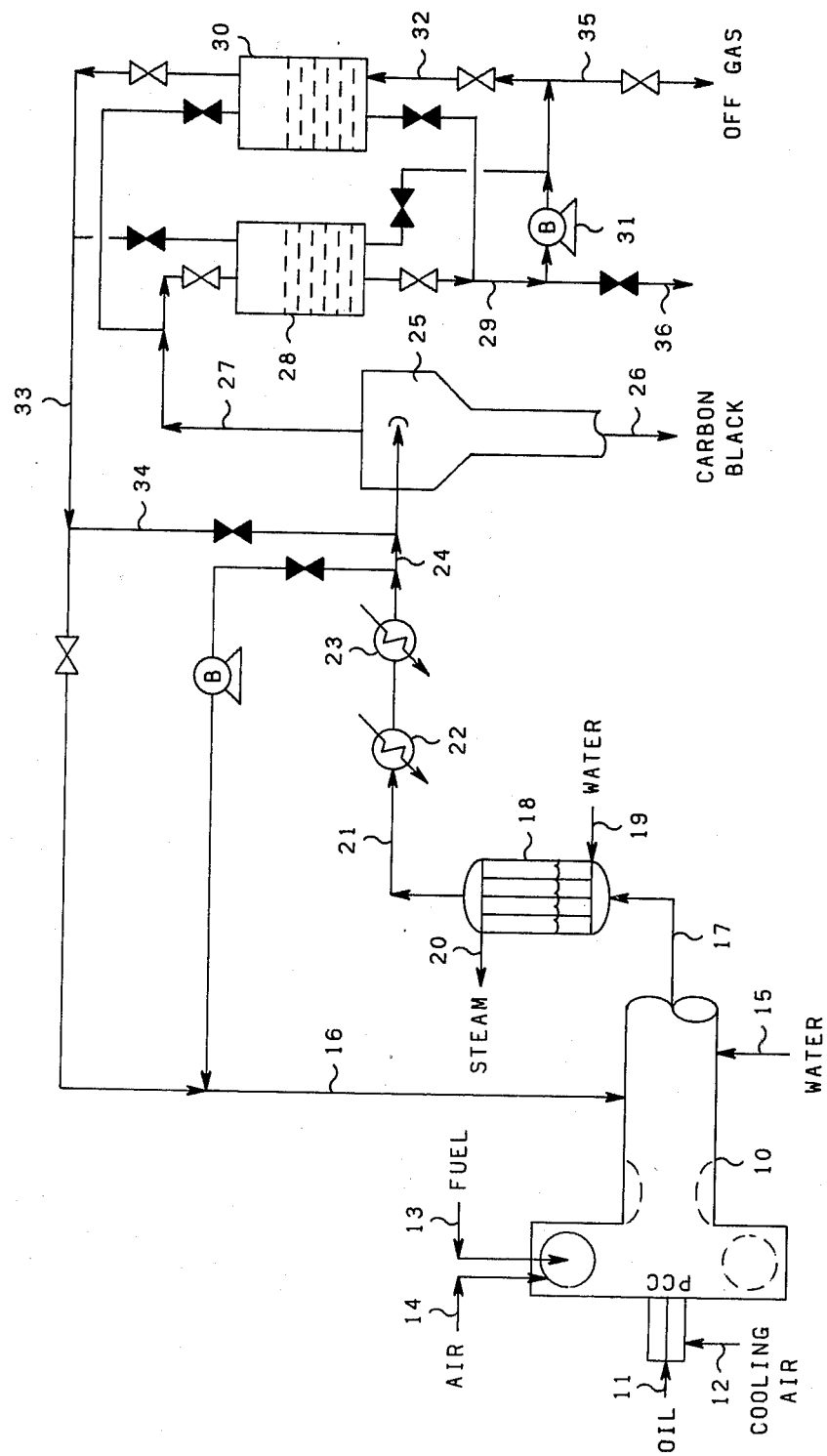

CARBON BLACK RECOVERY

This invention relates to the recovery of particulate carbon black from carbon black smoke. In accordance with one aspect, this invention relates to a process of filtering a carbon black smoke stream containing carbon black particles. Still more specifically in a further aspect, this invention relates to filtering carbon black containing smoke and regeneration of the filters with clean off-gas and recycle of the regeneration gas to the carbon black producing furnace as quench. In accordance with a more specific aspect, this invention relates to a carbon black recovery process using cyclones and aggregate filter beds to recover carbon black from carbon black containing smoke. Further, this invention relates to the filtering apparatus for carrying out the filtering process of the invention.

In commercial carbon black production by the furnace black process, the effluent gas from a series of carbon black furnaces is passed through a collecting system including various gas solid separators and filters. In every recovery or collection system various problems are confronted with respect to obtaining substantially complete removal of desired carbon black and yet yielding substantially clean off-gas from the system. The present invention is directed to a method and apparatus for the removal of carbon black from hot carbon black smoke in a combination of separations comprising cyclone separators and aggregate filter beds and use of off-gas (clean) for backflushing the aggregate filters to remove deposited carbon black and return as quench to the carbon black furnace.

Accordingly, an object of this invention is to provide a new filtering process.

Another object of this invention is to provide a new process for removing the solid particles from a carbon black containing gas stream.

Still another object of this invention is to provide a filtering process for filtering carbon black from carbon black containing gas streams and regeneration of the filtering equipment.

A further object of this invention is to provide a recycle quench stream for quenching hot carbon black smoke.

Other objects, aspects, and the several advantages of this invention will become apparent to those skilled in the art upon a study of the specification and appended claims.

In accordance with this invention, a process for recovering carbon black from a hot carbon black smoke stream is provided which comprises cooling the hot carbon black smoke stream by direct and by indirect heat exchange, subjecting the cooled carbon black smoke to cyclone separation to remove a substantial portion of the carbon black, passing gas removed from the cyclone separator through an aggregate filter bed to remove residual carbon black from the gas and regeneration of the aggregate filter bed with clean off-gas which is then recycled to the carbon black reactor as a quench stream. In current operations, the off-gas is passed through bag filters for the final cleaning. However, in accordance with the invention, the filter bag operation can be eliminated and a cyclone-aggregate bed filter system can be used instead.

A more complete understanding of the invention can be had by reference to the accompanying schematic drawing which is a flow diagram of a preferred embodiment of the invention.

Referring now to the drawing, the numeral 10 represents a series of reactors or furnaces producing carbon black according to conventional well-known furnace black processes as in U.S. Pat. No. 2,564,700. Feed or make oil is charged axially through line 11 to carbon black reactor 10 and nozzle cooling air is added by line 12 around the oil injection in line 11. The feed or make oil can be an aromatic oil of, for example, BMCI (Bureau of Mines Correlation Index) of 120 and a mid-boiling point of about 650–700° F. such as a solvent extracted aromatic oil from a heavy cycle oil produced from a catalytic cracking of a virgin gas oil or a topped or reduced crude oil.

Tangential hot combustion gases are produced from burning a fuel, for example, a fuel gas introduced by line 13 of 940 Btu/standard cubic feet with combustion and excess air introduced by way of line 14. The mass reacts to produce carbon black contained in gases between the combustion or precombustion zone or chamber (PCC) and downstream of the reaction zone 10. A venturi can be used at the inlet of so-called reaction zone or chamber 10. The reaction for pyrolyzing the oil 11 into carbon black occurs above 2400° F., usually above 2600° F. to 2900° F., depending on the type of carbon black desired to be produced.

The hot carbon black smoke produced within carbon black reactor 10 is quenched near the outlet end in order to reduce the temperature of the smoke prior to separation of carbon black particles. A quench fluid, such as water in line 15 and/or recycled cool gas in line 16, for example, at 400–450° F., reduces the reactor effluent from carbon black smoke to below 2200° F., preferably to about 2000° F. The water 15 can be introduced at a temperature of about 100° F. The amount of quench fluid used will be sufficient to lower the carbon black smoke temperature to the desired level. It is desirable to quench the carbon black furnace effluent to a temperature of about 2000° F., or even below that temperature, since the carbon black formation reaction is substantially stopped although structure and photelometer can be altered even below temperatures of about 2000° F.

The quenched reactor effluent removed by line 17 is passed through the tube side of a shell-tube heat exchanger 18. High pressure preheated water, for example 600 psia and about 485° F., introduced by line 19 is removed as high pressure steam from the shell-side of exchanger 18 by line 20. The effluent removed from exchanger 18 by line 21 is at about 1200° F. and is further indirectly cooled in indirect heat exchangers 22 and 23. Exchanger 22 is conveniently used to preheat air 14 and exchanger 23 can be conveniently used to preheat the feed oil 11. The effluent from exchanger 23 is passed by way of line 24 at about 700° F., for example, to cyclone separator 25 from which a major portion of the carbon black (loose or flocculent black) is recovered by line 26 and can be passed to further processing which is wet pelleting and drying (not shown).

Although only one cyclone separator 25 is shown in the drawing, it should be recognized that a series of cyclone separators can be used. The suspension of carbon black in line 24 is passed through the cyclone separators under conditions such that a substantial portion of the carbon black is removed by line 26. Effluent gas containing a minor amount of carbon black is passed through line 27 through a series of aggregate bed filters 28. Clean effluent off-gas is removed from filter beds 28 by line 29. In a preferred embodiment, filter 28 can contain sand or gravel or other suitable aggregate filtering mediums. Filter 28 is a fixed bed of aggregate which filters out the remaining carbon black from the gases and is one of several units on the filtration cycle. Filtration zone 30 is on the carbon black removal cycle or regeneration cycle. This unit is operated as a fluidized fixed bed of aggregate, using a portion of the clean off-gas or carbon black free off-gas 29 from filtering unit 28 to remove the carbon black from filter bed 30. The clean off-gas is passed through blower 31 to increase the pressure for passing the clean off-gas through line 32 into the base of filter bed 30. The removed carbon black in the regeneration gas removed from filter bed 30 on regeneration cycle is passed by way of line 33 and line 16 and passed as part of the quench fluid through the carbon black reactor 10. If desired, a portion of the regeneration gas containing carbon black in line 33 can be passed by way of line 34 to cyclone separator 25.

Clean off-gas can be removed from the system at either line 35 or line 36 which would be upstream of blower 31.

Although only a single filter bed 28 is shown on the filtering cycle and a single bed 30 on regeneration, it should be understood that multiple beds can be in operation in a continuous cycle wherein most of the beds are on the filtering cycle and one or more are on a cleaning regeneration cycle. Suitable conduit manifolding will be provided along with the appropriate valving so that there will be continuous operation of units on a filtering cycle and one or more on regeneration cycle.

In order to still more fully explain the invention, typical calculated operating data are given in the following tabular example. The illustrative calculated example, for simplicity of illustration of the invention, returns the carbon black containing gas 33 removed from the filtering bed being regenerated via the quench 16 ultimately yielding out by way of line 26.

CALCULATED EXAMPLE

Carbon Black Reactor 10:

| | | |
|---|---|---|
| 11 | Make Oil, G/H | 360 |
| | Temp., °F. | 500 |
| | BMCI | 124 |
| | Boiling Range, °F. | 600 to 1,200 |
| 12 | Nozzle Cooling Air, SCF/H | 6,000 |
| 13 | Fuel (Gas, 940 Btu/SCF), SCF/H | 12,200 |
| 14 | Tangential Air, SCF/H | 220,000 |
| | Temp., °F. | 900 |
| 16 | Quench Gas, SCF/H | 129,000 |
| | Temp., °F. | 400 |
| | LBS Carbon Black/1000 SCF | 5.2 |
| 17 | Quenched Effluent, SCF/H | 439,000 |
| | Temp., °F. | 2,000 |
| 24 | Final Effluent, SCF/H | 439,000 |
| | Temp., °F. | 700 |
| 26 | Carbon Black, Lbs/hr. | 1,575 |
| | Typical N220 | |
| 27 | Gas to Filter 28, SCF/H | 439,000 |
| | Lbs Carbon/1000 SCF | 5.06 |
| | Temp., °F. | 600 |
| 29 | Cleaned Off-Gas, SCF/H | 439,000 |
| | Lbs Carbon/1000 SCF | Nil |
| | Pressure, psig | 0.5 |
| 35 | Off-Gas Yield, SCF/HR | 310,000 |
| | Pressure, psig | 6 |
| | Temp., °F. | 450 |
| 32 | Regeneration Gas, SCF/HR | 129,000 |
| | Pressure, psig | 5 |
| | Temp., °F. | 450 |

Units 28 and 30:*

Gravel (sand, mostly silica)  (composition of material)
(a) Size Range  10 to 16

CALCULATED EXAMPLE -continued

| | | U.S. Std. Mesh |
|---|---|---|
| (b) Pounds of Gravel/1000 SCF of Gas/Hr | | 9 to 20 |
| (c) Bed Size | | |
| Diameter, Ft. | | 2.5 |
| Height, Ft. | | 0.5 |
| 28 | Time on Filter Cycle, Min. | 18.5 to 74 |
| 30 | Time on Cleanup, Min. | 0.5 to 2 |

*(38 units like 28 or 30; 37 on filter, one being cleaned)

The filter aggregate which can be used will preferably range from about 10 to about 16 U.S. Standard Mesh size. The aggregate can be comprised of silica, alumina, magnesium hydroxide, calcium sulfate, silica-alumina, and the like materials which are relatively inert to the carbon black quenched reactor effluent. The loose or bulk density of the aggregate will range from about 75 to 125 pounds per cubic foot.

I claim:

1. A process for filtering solids from carbon black smoke produced in a carbon black furnace by the pyrolysis of hydrocarbon oil under conditions forming a hot smoke having a temperature above 2200° F. which comprises:
    (a) quenching said hot smoke removed from said furnace to a temperature of about 2000° F. or below by injecting into it recycle smoke subsequently to be described;
    (b) cooling said hot smoke further by indirect heat exchange to a temperature of about 700° F. or lower;
    (c) passing said hot smoke, cooled in (b), to a cyclone separation zone to remove a substantial portion of the carbon black solids present as product for further processing as desired;
    (d) removing carbon black smoke substantially reduced in solids content from said cyclone separation zone and then passing same through a filtration zone on filtering cycle containing a bed of aggregate filtering medium to further remove solids therefrom;
    (e) withdrawing off-gas substantially free of carbon black solids from (d);
    (f) passing at least a portion of said off-gas in (e) to a filtration zone on regeneration cycle containing aggregate filtering medium and carbon black solids under conditions to substantially remove said carbon black solids; and
    (g) recycling said off-gas containing carbon black solids removed in (f) to (a) as quench to reduce the temperature of said hot smoke.

2. A process according to claim 1 containing the additional steps of
    (h) increasing the pressure of said off-gas in (f) prior to introducing same into said filtration zone on regeneration cycle and
    (i) returning a portion of the recycle gas in (g) to the said cyclone separation zone for recovery of additional carbon black.

3. A process according to claim 1 wherein step (b) comprises the additional steps of
    cooling said hot smoke with water to form steam;
    cooling said hot smoke further by indirect heat exchange with oxygen-containing gas going to said furnace; and cooling said hot smoke further by indirect heat exchange with hydrocarbon oil going to said furnace to heat said oil and to produce cooled smoke at a temperature of about 700° F. or lower for passage to said cyclone separation in (c).

4. A process according to claim 1 wherein said filtration zone in steps (c) and (f) on filtering and regeneration cycles comprises a plurality of filtration zones on filtration cycles and at least one filtering zone on regeneration cycle.

5. A process according to claim 4 wherein a portion of the off-gas used for regeneration of one of the filtering zones and regeneration cycle is returned to the cyclone separation zone.

* * * * *